US011015157B2

(12) United States Patent
Mitchell et al.

(10) Patent No.: US 11,015,157 B2
(45) Date of Patent: May 25, 2021

(54) BREWING SYSTEM FOR KOMBUCHA AND OTHER FERMENTED BEVERAGES

(71) Applicant: PicoBrew, LLC, Seattle, WA (US)

(72) Inventors: James B. Mitchell, Seattle, WA (US); Avi R. Geiger, Seattle, WA (US)

(73) Assignee: PB Funding Group, LLC, Bellevue, WA (US)

( * ) Notice: Subject to any disclaimer, the term of this patent is extended or adjusted under 35 U.S.C. 154(b) by 283 days.

(21) Appl. No.: 16/190,190

(22) Filed: Nov. 14, 2018

(65) Prior Publication Data

US 2020/0148984 A1 May 14, 2020

(51) Int. Cl.
| | |
|---|---|
| C12G 3/02 | (2019.01) |
| C12C 11/00 | (2006.01) |
| C12G 3/025 | (2019.01) |
| C12C 11/09 | (2006.01) |
| A23F 3/10 | (2006.01) |

(52) U.S. Cl.
CPC .............. *C12G 3/025* (2013.01); *A23F 3/10* (2013.01); *C12C 11/006* (2013.01); *C12C 11/09* (2013.01); *C12G 3/02* (2013.01)

(58) Field of Classification Search
CPC ............. A23F 3/10; C12G 3/02; C12C 11/11; C12C 11/006; C12C 11/07; C12C 11/09
USPC .............. 99/276, 277, 277.1, 278, 291, 317
See application file for complete search history.

(56) References Cited

U.S. PATENT DOCUMENTS

| | | | | | |
|---|---|---|---|---|---|
| 1,345,947 | A | * | 7/1920 | Muller | A47J 31/20 |
| | | | | | 99/298 |
| 10,138,449 | B2 | * | 11/2018 | Hobson | A23L 11/03 |
| 2014/0127372 | A1 | * | 5/2014 | Crosato | C12G 1/02 |
| | | | | | 426/474 |
| 2016/0237387 | A1 | * | 8/2016 | Leutz | C12G 3/024 |
| 2020/0270556 | A1 | * | 8/2020 | Tull | A23L 2/382 |

FOREIGN PATENT DOCUMENTS

WO   WO-2018204243 A1 * 11/2018 ............... C12H 1/00

* cited by examiner

*Primary Examiner* — Reginald Alexander
(74) *Attorney, Agent, or Firm* — Krajec Patent Offices, LLC; Russell Krajec

(57) ABSTRACT

Kombucha, kefir, and other fermented beverages may be manufactured using a fermenter that draws off some fermented beverage, then adds starter liquid to a fermenter. Production may be regulated by managing heat, oxygen, or other inputs to achieve a desired quantity of finished beverage output, and production may be increased or decreased to match consumption. A controller may monitor beverage consumption and may adjust processing variables to achieve production goals, while automatically managing the overall process. A system may have a feed tank from which unprocessed liquid may be added to the fermenter at the same or similar quantities as finished beverage may be transferred to a dispensing system. The system may operate with little expertise or knowledge by a human operator.

14 Claims, 5 Drawing Sheets

BREWING SYSTEM FOR KOMBUCHA AND OTHER FERMENTED BEVERAGES

BACKGROUND

Kombucha, kefir, and other beverages have been made for centuries using a symbiotic colony of bacteria and yeast, otherwise known as SCOBY. Once started, the SCOBY may be used from batch to batch to convert a liquid such as sweetened tea, milk or other liquid into a fermented beverage.

SUMMARY

Kombucha, kefir, and other fermented beverages may be manufactured using a fermenter that draws off some fermented beverage, then adds starter liquid to a fermenter. Production may be regulated by managing heat, oxygen, or other inputs to achieve a desired quantity of finished beverage output, and production may be increased or decreased to match consumption. A controller may monitor beverage consumption and may adjust processing variables to achieve production goals, while automatically managing the overall process. A system may have a feed tank from which unprocessed liquid may be added to the fermenter at the same or similar quantities as finished beverage may be transferred to a dispensing system. The system may operate with little expertise or knowledge by a human operator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
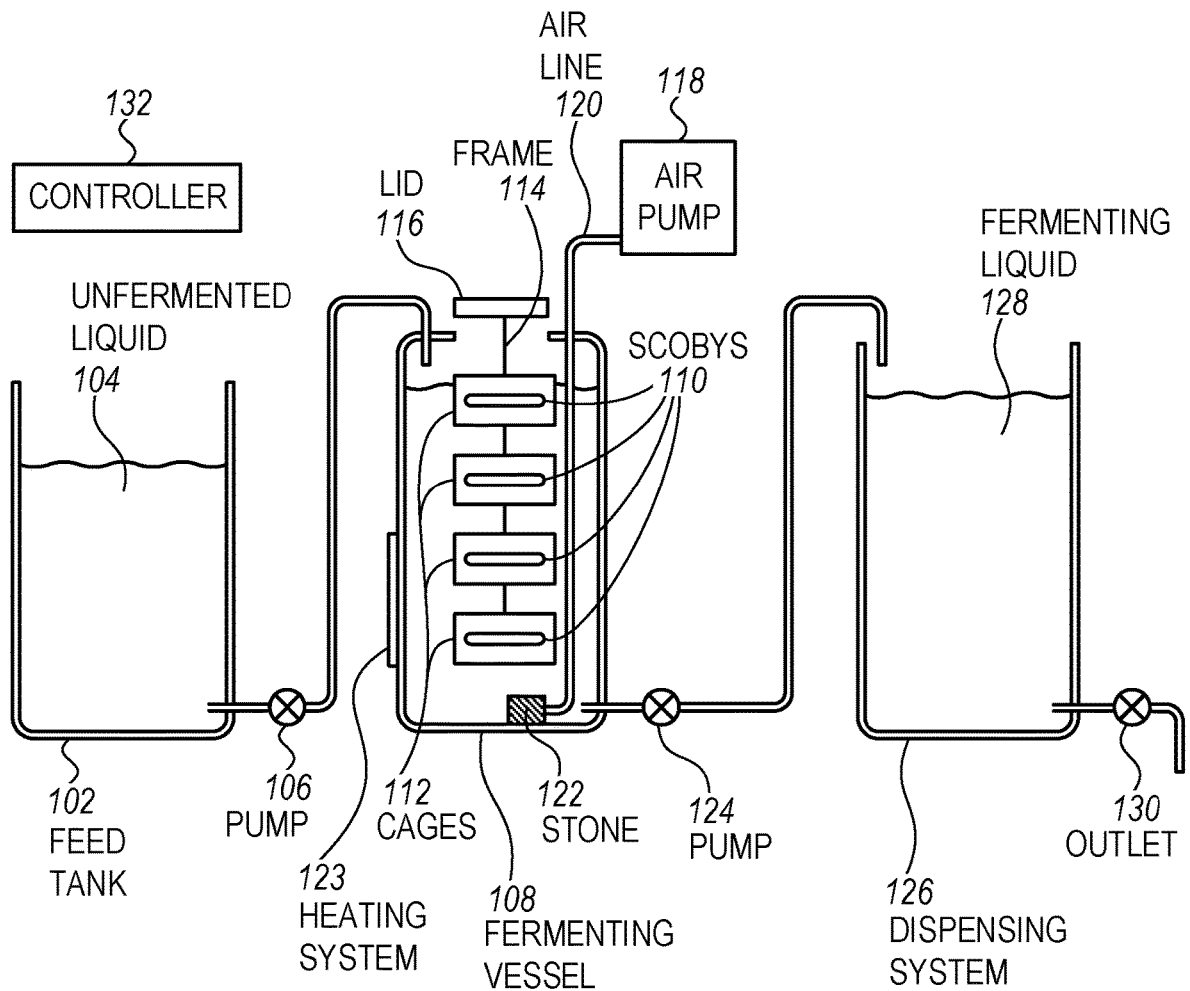
FIG. 1 is a diagram illustration of an embodiment showing a system for fermenting beverages using SCOBYs.

Brewing System for Kombucha and Other Fermented Beverages

A brewing system may automatically ferment kombucha and other fermented beverages using a bleed and feed system, where a portion of fermented beverage may be drained from the fermenter and a fresh supply of unfermented liquid may be added. Such a system may manage variability in production demand by adjusting heat, oxygen, and other factors that may speed up or slow down production.

A brewing system may provide a near-continuous supply of fermented beverage by detecting the amount of beverage consumed from a dispensing system, and adjusting production to meet the usage. Such a system may be used in a retail location, such as a coffee shop, bar, or other venue where the consumption may vary over the course of a week. In response to days where consumption may be heavy, the system may increase production. When consumption may be light, the system may reduce production.

The brewing system may be automated such that a controller may remove finished beverage from the fermenter then add unfermented liquid automatically. The brewing system may monitor fermentation to determine when fermentation has completed, then automatically bleed the completed beverage and resupply the fermenter for another cycle. The system may operate with little human interaction, save to add more unfermented liquid to a reservoir.

A fermenter may house one or more SCOBYs, which may ferment the beverage. In some cases, a series of SCOBY containers may be submerged in the fermenter. Having multiple SCOBYs may speed up the fermentation process, such that a smaller fermenting system may provide the equivalent production of a larger system that may use only a single SCOBY.

A fermenter may have a submerged air or oxygen supply, which may provide oxygen for fermentation, as well as to mechanically stir or mix the fermenting beverage. Such a gas supply may have a stone or other bubble-generating mechanism that may be submerged in the beverage. In many cases, such a gas supply may be placed below the lowest SCOBY when multiple SCOBYs are used. Such a placement may ensure that each SCOBY receives sufficient oxygen to perform its work during fermentation.

A fermenter may include a heating system, such as a warming jacket placed under or around the vessel, an immersion heating system, or some other heating mechanism. Some systems may have a recirculating heating system, where liquid may be recirculated out of the fermenter, through a heating system, and may return to the fermenter. In many cases, the heating system may be controllable by the controller. The controller may adjust the temperature of the fermenting vessel to control the rate of fermentation. When more production may be desired, the controller may increase the fermentation temperature so that the fermentation batches are shorter and more beverage may be produced. When less production may be desired, the controller may reduce the temperature to slow down the fermentation process.

A controller may include temperature sensors, pH sensors, alcohol sensors, sugar or BRIX sensors, vessel level sensors, and other sensors. Some sensors may be used to monitor the status of the overall system, such as the vessel level sensors in a dispensing system or in an unfermented liquid reservoir. Other sensors may be used to monitor the progress of fermentation.

A dispensing system may have various mechanisms to determine how much beverage may have been consumed. Some systems may have a level sensor, which may detect the liquid height in a dispensing reservoir. Other systems may have a dispensing counter that may detect the amount of liquid dispensed, yet other systems may have a scale which may weigh the dispensing system to determine beverage consumption, while still other systems may have other mechanisms that may measure or estimate the amount of beverage that may have been used.

The amount of beverage consumed may be fed back to a controller to adjust fermentation times to match consumption. In an example of a retail outlet that may produce beverage for retail sale, consumption may vary from one day to the next during the week, and may vary during holidays and other seasonal variations. Such a system may be configured such that a fermenter may produce batches as fast as every day and as slow as every four days, for example.

In the example, a dispenser may be sized to contain two days' worth of consumption on the busiest days. The dispenser may further be sized to contain two or more batches of output from the fermenter. Since the fermenter may release ¼ of its contents with each batch, the fermenter may be approximately twice the size of the dispensing system.

In the example, since the fermenter may be controlled to produce a batch between once a day to once every four days, the overall system may produce fermented beverages in varying volumes to match retail sales. Such a system may produce freshly fermented beverage with a minimum of waste and be responsive to actual consumption.

Some systems may release ⅓, ½, or some other ratio of finished beverage from the fermenter when fermentation has completed. An equal volume of unfermented liquid may then be added to the fermenter to process another batch of beverage.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a system for fermenting beverages using SCOBYs. A SCOBY is a Symbiotic Culture of Bacteria and Yeast, and has been used for centuries for fermenting beverages, such as kombucha.

A feed tank 102 may contain unfermented liquid 104, which may pass through a pump 106, valves, or other electrically controlled apparatus to be introduced into a fermenting vessel 108.

The fermenting vessel 108 may contain several SCOBYs 110, each of which may be contained in different cages 112. Each of the cages 112 may hold a SCOBY, and in many cases, the SCOBYs may be held in a submerged location below the level of the fermenting liquid.

The set of cages 112 may allow for multiple SCOBYs in a single fermenting vessel 108. The cages 112 may be connected by a frame 114 and may be connected to a lid 116 for removal from the fermenting vessel 108.

By having multiple SCOBYs, fermentation time may be decreased compared to a conventional system where only one SCOBY may be present. Multiple SCOBYs may ferment considerably faster, such as by decreasing fermentation time from 14 days to 3 days or less. Because fermentation may be decreased so much, a system 100 may produce more finished beverage than a conventional system that takes 14 days or more to ferment.

One use case for the system 100 is for a commercial or retail operation, where beverages may be consumed on a regular but varying rate. Some days may have more consumption while other days may have less. A typical use case may be in a coffee shop or restaurant, where consumers may wish to purchase fresh beverages, but sales may vary considerably from day to day or week to week.

A controller 132 may monitor the amount of beverage consumed and may regulate the fermentation speed to attempt to match production with actual consumption. One method for controlling the speed of fermentation may be to introduce air from an air pump 118 into the fermenting vessel 108. An air pump 118 may be connected to an air line 120, which may dispense air through a stone 122 or other diffuser.

Introduction of air or oxygen to the fermenting liquid may increase production of bacteria in the SCOBY, which may speed fermentation. Similarly, a heating system 123 may be adjusted to control the yeast activity in the SCOBY. Increasing temperature may increase yeast production. In many cases, the stone 122 or other diffuser may be placed below the level of some of the SCOBYs. The introduction of air may cause the fermenting liquid to circulate and distribute air or oxygen within the vessel, thereby assisting fermentation to progress quickly.

In many cases, an air or oxygen supply may be turned on and off periodically. For example, some systems may be configured to turn on an air supply for 10 minutes every hour, and for 50 minutes each hour, no air may be added. In order to increase the amount of air, the air pump 118 may be configured to operate for 15 or 20 minutes every hour. Other systems may have variable speed air pumps or other mechanisms by which the amount of air or oxygen may be varied and controlled.

When fermentation has completed, a portion of the fermented beverage may be drawn off and added to a dispensing system 126 using a pump 124, valve, or other mechanism. In a typical use case, only a portion of the fermented beverage may be removed, and an equivalent amount of unfermented liquid 104 may be added to replenish the amount of finished beverage that may be removed. Such as system may be known as a "bleed and feed" system of a "continuous" fermentation system. Such systems may take advantage of the fermented beverage that remains in the fermenting vessel 108 to start fermenting the unfermented liquid very quickly and efficiently.

Some systems may be configured to draw off 10%, 20%, 25%, 33%, 50%, or more finished beverage from each batch. The more finished beverage that may be drawn off may increase the variability between batches, but drawing off larger amounts may produce more finished beverage to meet consumption demands.

A dispensing system 126 may contained fermented liquid 128, which may be dispensed through an outlet 130. In some systems, a dispensing system 126 may force carbonate the beverage, filter the beverage, or otherwise perform secondary operations to the beverage. The dispensing system 126 may have a mechanism to monitor the amount of beverage being sold or consumed from the system. During some periods, the consumption may be high with many drinks being sold or consumed. During other periods, consumption may be low.

By monitoring the actual usage or consumption through the dispensing system 126, a controller 132 may be able to adjust the fermentation conditions to speed up or slow down production. In many cases, a fermenting cycle may last between a day and several days, so a controller 132 may be able to detect that consumption has increased and therefore the controller 132 may be able to speed up fermentation of a current batch. Some systems may operate by making adjustments to a subsequent batch without making changes to a current batch.

Figure 2:
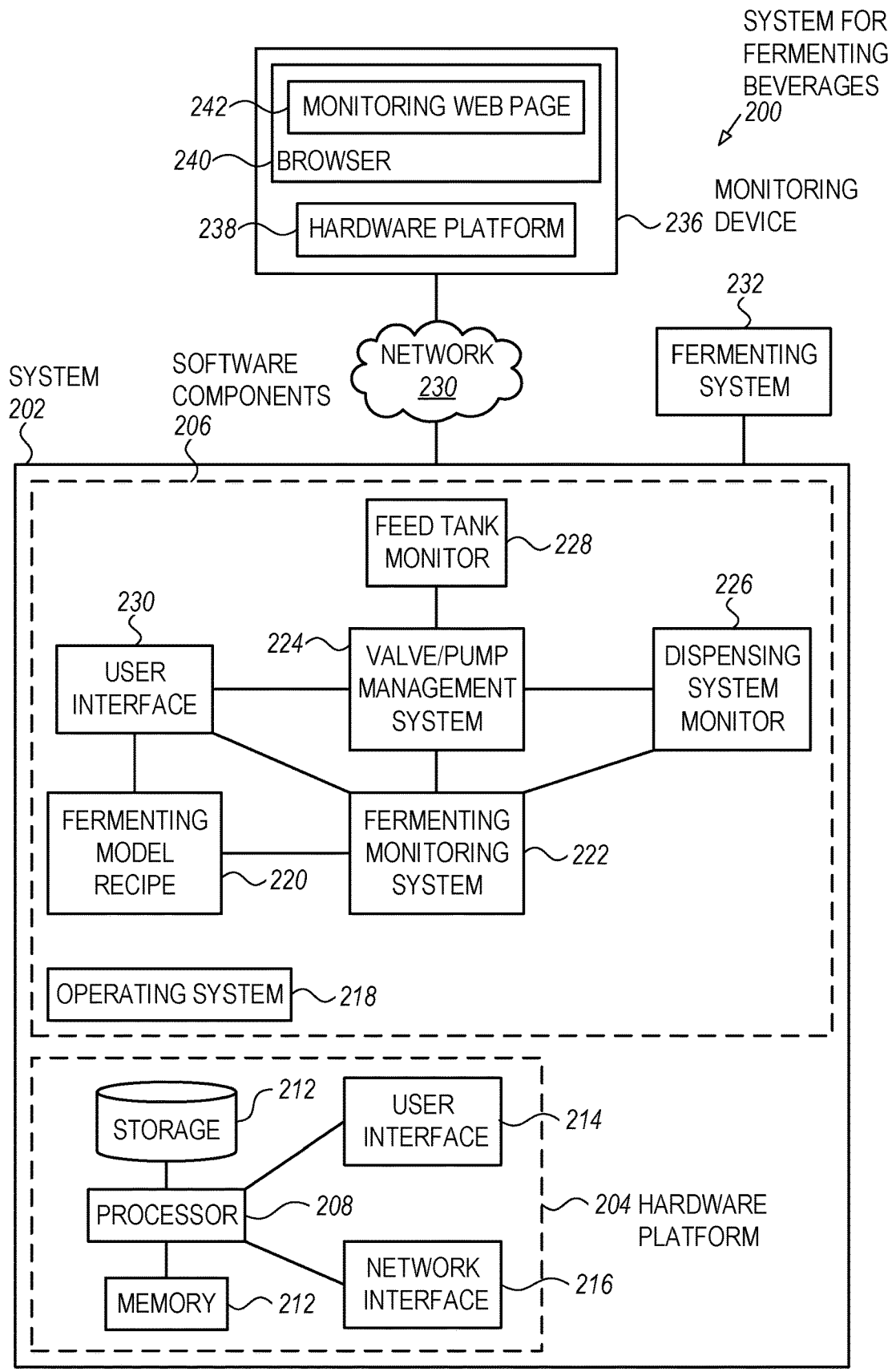
FIG. 2 is a diagram illustration of an embodiment showing a schematic or functional representation of a network with a system for fermenting beverages.

FIG. 2 is a diagram of an embodiment 200 showing components that may produce fermented beverages. The components are illustrated as being connected across a network 234.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A fermentation model recipe 220 may be an algorithmic representation of a fermentation process. The fermentation model recipe 220 may be able to estimate fermentation completion based on the time, temperature, airflow, and other factors. The fermentation model recipe 220 may estimate changes to fermentation time based on changes in the various inputs, thereby allowing a fermentation monitoring system 222 to establish fermentation parameters that may meet a production goal.

A fermentation monitoring system 222 may accept input and provide output commands to and from a valve and pump management system 224 as well as a dispensing system monitor 226. The valve and pump management system 224 may be connected to various liquid and air pumps, valves, sensors, and other equipment by which a fermentation system may transfer liquid from one vessel to another, as well as monitor fluid levels and other functions.

Many systems may use pumps and valves to transfer liquid from one vessel to another. Some systems may be configured for gravity feed, where one vessel may feed another vessel. An example may be to mount a feed tank above a fermentation vessel. A controller may be able to cause liquid to be transferred by merely opening a valve.

The dispensing system monitor 226 may monitor, measure, and control a system from which finished beverage may be dispensed. The dispensing system monitor 226 may include a mechanism to measure the amount of beverage consumed. The amount of beverage consumed may be used by a fermentation monitoring system 222 to determine the amount of beverage to produce, and may cause the fermentation process to speed up or slow down in response to consumption.

A feed tank monitor 228 may include a set of sensors relating to the feed tank. In many cases, the feed tank monitor 228 may include a level sensor, where the amount of unfermented liquid may be sensed. In response to a level being too low, a fermentation monitoring system 222 may issue an alert to an operator to refill the feed tank.

A user interface 230 may be a web page from which an administrator or operator may be able to program the operation of a fermenting system 232, as well as start, stop, and monitor any operations of the system. The user interface 230 may be illustrated as a web page that may be remotely accessible, but other implementations may include a physical display mounted on or near the fermenting system 232.

The fermenting system 232 may be the hardware system that may be monitored and controlled by the system 202. An example of a fermenting system 232 may be found schematically in embodiment 100.

A monitoring device 236 may communicate with the system 202 through a network 234. The monitoring device 236 may have a hardware platform 238 on which a browser 240 may operate. Within the browser 240, a monitoring web page 242 may be displayed. The monitoring web page 242 may be generated by the user interface 230.

Figure 3:
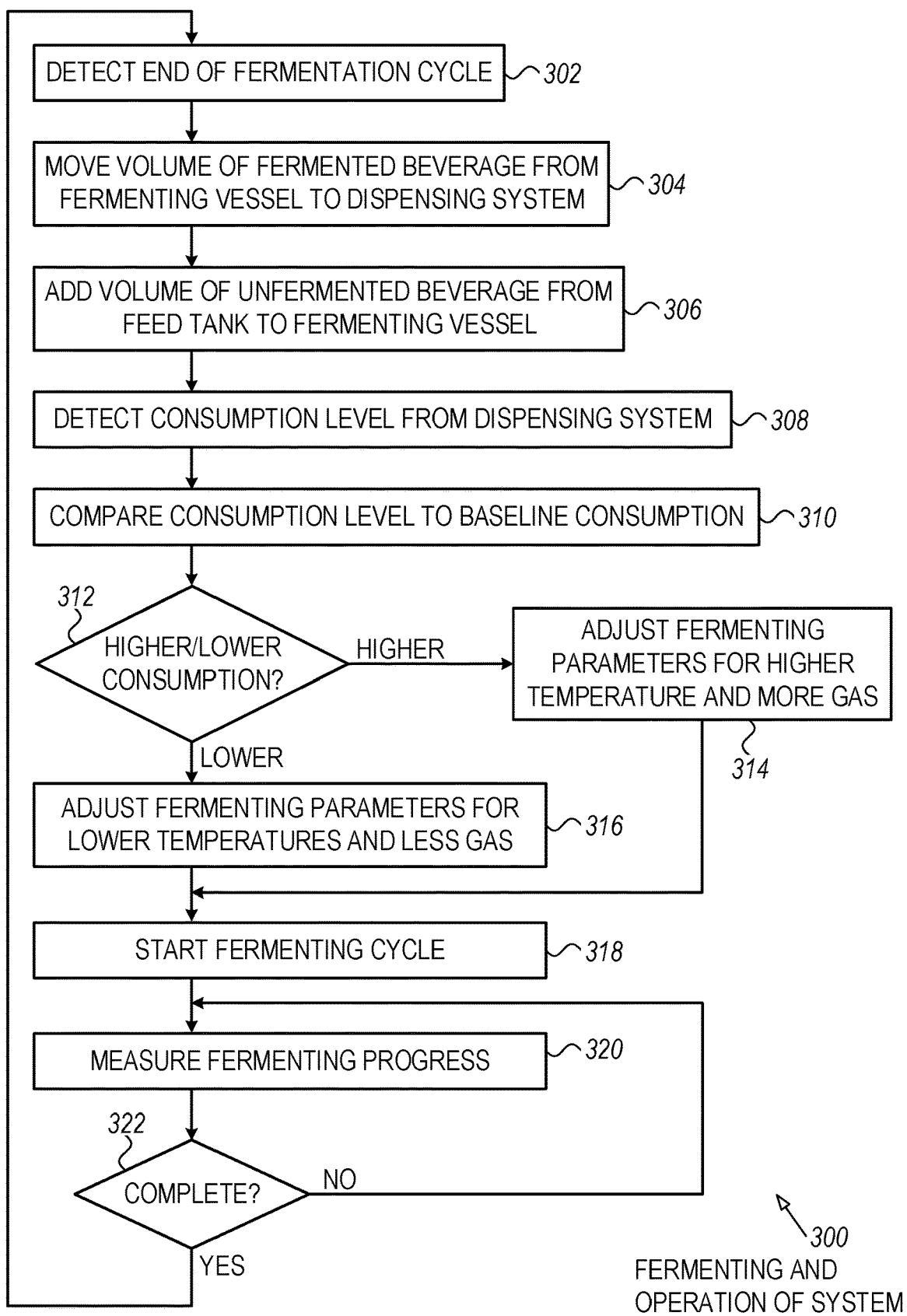
FIG. 3 is a flowchart illustration of an embodiment showing a method for fermenting and operating a system.

FIG. 3 is a flowchart illustration of an embodiment 300 showing a method performed by a fermentation controller when controlling a fermentation system, such as the fermentation system illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may illustrate one method by which a fermentation system may be monitored and controlled. The method may use the amount of beverage consumed to adjust the fermentation parameters for the next fermentation cycle.

The end of a fermentation cycle may be detected in block 302. In some embodiments, the end of a fermentation cycle may be indicated by a timeout of a fermentation sequence. Such a system may calculate the length of time for a fermentation sequence, then configure a timer to expire when the sequence has completed. Other systems may have a sensor or series of sensors that may be used to indicate fermentation completion. One such system may have pH and BRIX or sugar sensors, which may be used to determine when fermentation has finished. Another such system may have an alcohol sensor, which may also be used separately or in conjunction with other sensors to determine when fermentation has finished.

A volume of fermented beverage may be removed from the fermentation vessel to the dispensing system in block 304. An equivalent volume of unfermented liquid may be added in block 306. In many systems, a certain percentage of beverage may be removed, such as 10%, 20%, 25%, 33%, 50%, or more. By leaving a quantity of finished beverage in the fermenter, unfermented liquid may quickly undergo fermentation.

A consumption level may be detected in block 308 from a dispensing system. The detected consumption level may be compared to a baseline consumption level in block 310.

If the detected consumption is higher than the baseline in block 312, the fermenting parameters may be adjusted in block 314 to increase temperature and increase air applied to the fermenter. If the detected consumption is lower than the baseline in block 312, the fermenting parameters may be adjusted in block 316 to decrease temperature and decrease the air applied to the fermenter.

The changes made in block 314 and 316 may effectively speed up or slow down the fermenting process. When fermenting is sped up, the quantity of finished beverage may be increased since more beverage may be produced per unit time. When fermenting is slowed down, the quantity of finished beverage may be decreased.

Once the new fermenting parameters have been determined in blocks 314 or 316, the fermenting cycle may be started in block 318. The fermenting process may be measured in block 320 and if fermenting has not completed in block 322, the process may return to block 320. Once fermentation has completed in block 322, the process may return to block 302.

Figure 4:
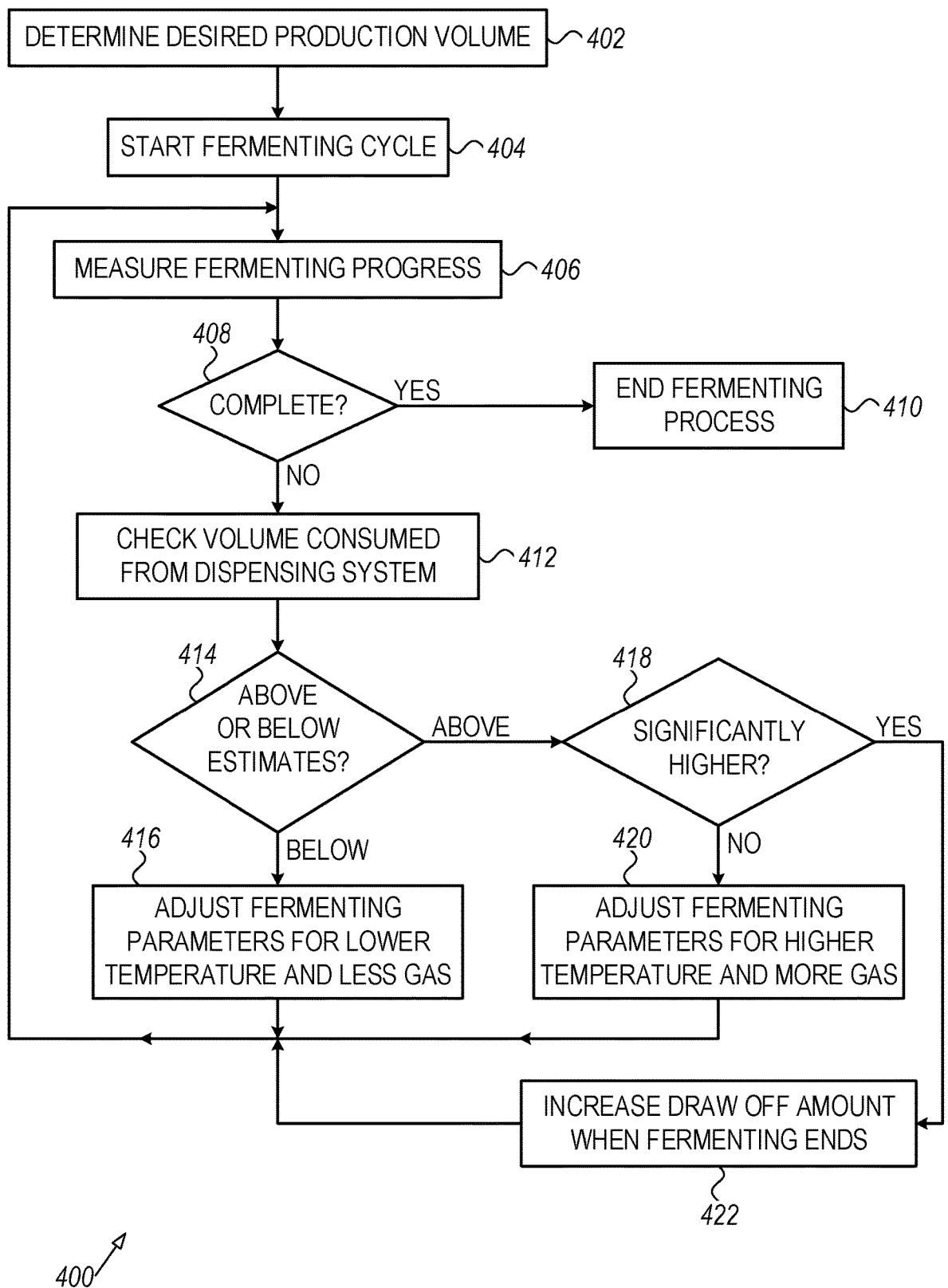
FIG. 4 is a flowchart illustration of an embodiment showing a method for making dynamic adjustments to a fermenting process.

FIG. 4 is a flowchart illustration of an embodiment 400 showing a method for adjusting a fermentation process while the process may be ongoing. Embodiment 400 is merely one example of changes that may be made to a fermentation process in response to detecting that consumption has increased or decreased from what may have been expected.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A desired production volume may be determined in block 402. In some cases, the desired production volume may be defined by a time of a brewing cycle. The production volume may be calculated by determining the amount of beverage that may be produced in one batch, then divide by the amount of time to process a batch.

A fermenting cycle may begin in block 404.

After starting the fermenting cycle in block 404, the progress of the fermentation may occur in block 406. The progress may be measured by various sensors, such as a pH sensor, alcohol sensor, and BRIX or sugar sensor. In some cases, the progress may be defined by a length of time for fermentation at a given temperature. In such cases, the progress may be defined by a countdown timer or some other time measurement. In still other cases, a fermentation cycle may be determined complete when a user may taste the fermented beverage and manually determine that fermentation has completed. When fermentation has completed in block 408, the fermentation process may end in block 410.

When fermentation has not yet completed in block 408, the volume of beverage consumed in the dispensing system may be checked in block 412. If the current measurement of consumed beverage is below the estimated consumption in block 414, the fermenting parameters may be adjusted for lower temperature and less gas addition in block 416. Similarly, if the consumption is above estimates in block 414 and the consumption is not significantly higher in block 418, the fermenting parameters may be adjusted in block 420 to increase temperature and gas addition.

Such changes to the fermenting process may speed up or slow down an existing fermentation process to help offset changes to the estimated usage in a dispensing system. Such a system may attempt to match the fermentation production to the actual consumption as measured from a dispensing system.

In some cases, the increase in consumption may be significantly higher in block 418. In such cases, the amount of beverage drawn off when fermentation ends may be increased in block 422. Such a situation may occur when a high level of consumption may not be adequately compensated by merely adjusting the fermentation parameters.

Figure 5:
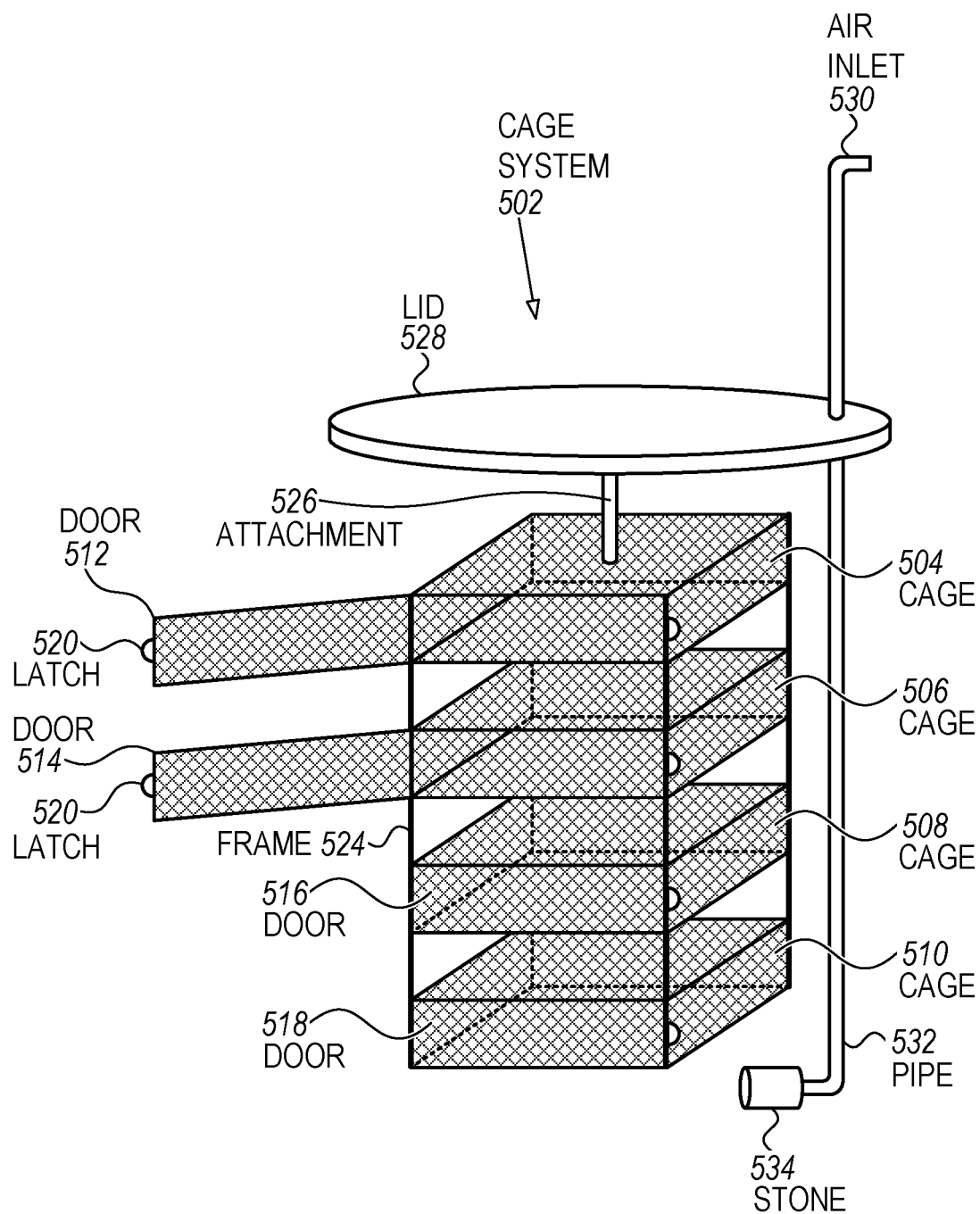
FIG. 5 is a diagram illustration of an embodiment showing a set of SCOBY cages in a cage system.

FIG. 5 is a diagram illustration of an embodiment 500 showing SCOBY cages that may be used in a fermenting vessel. Embodiment 500 is merely one schematic representation of a device that may hold several SCOBYs, and in this example, four SCOBYs. The SCOBYs may be held in several different cases, many of which may be submerged in a vessel during fermentation.

A cage system 502 may have several SCOBY cages 504, 506, 508, and 510. The respective cages are shown with doors 512, 514, 516, and 518. Doors 512 and 514 may be illustrated as being open, with latches 520 and 522 that may be used to hold the respective doors closed.

The cages may be made from a perforated material, such as perforated metal, wire mesh, or some other material through which fermenting liquid may flow. In some cases, the cages may have pliable or even woven or mesh material that may capture a SCOBY and hold the SCOBY during fermentation.

The SCOBY cages may be positioned such that each SCOBY may come into contact with as much fermenting liquid as possible during the fermentation process. The separation between cases may allow liquid to flow between the SCOBYs, thereby allowing the SCOBYs to process the unfermented liquid.

The cages may be held together in a rigid manner using a frame 524, which may be attached to a lid 528 through an attachment 526. The lid 528 may be affixed to a fermentation vessel. In many cases, the various cages may fit though an opening in the fermentation vessel, and the lid 528 may seal against an opening in the vessel. The lid 528 may be secured against the opening, or may be allowed to rest against the opening.

An air inlet 530 may be connected to an air pump, oxygen source, or other gas source. Air may be pumped through the pipe 532 and enter a fermenting liquid through a stone 534. The stone 534 may be placed under the various SCOBY cages such that gas introduced through the stone 534 may cause liquid to circulate past the SCOBY cages. In many cases, the lid 528 may include a gas vent.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a fermenting vessel comprising a plurality of SCOBY cages, said SCOBY cages each having openings through which liquid flows and positioned such that at least one SCOBY is submerged during normal operation;
   a first electrically controllable connection from a feed tank to said fermenting vessel, said first electrically controllable connection configured to receive unfermented liquid from said feed tank in response to a first electronic signal;
   a second electrically controllable connection from said fermenting vessel to a dispensing system, said second electrically controllable connection configured to transfer fermented liquid from said fermenting vessel to said dispensing system;
   a controller comprising a processor and configured to perform a method comprising:
      causing said unfermented liquid to pass from said feed tank to said fermenting vessel actuating said first electrically controllable connection;
      determining that fermentation of said unfermented liquid has completed in said fermenting vessel, creating said fermented liquid; and
      causing said fermented liquid to pass from said fermenting vessel to said dispensing system by actuating said second electrically controllable connection.

2. The system of claim 1, said fermenting vessel comprising a heating system, said heating system being controllable by said controller, said method comprising:
   determining an anticipated fermenting time; and
   adjusting said heating system to achieve said fermenting time.

3. The system of claim 2, said method further comprising:
   determining a standard recipe having a standard fermenting temperature and a standard fermenting time;
   determining that said anticipated fermenting time is shorter than said standard fermenting time and adjusting said heating system to a fermenting temperature higher than said standard fermenting temperature.

4. The system of claim 2, said fermenting vessel further comprising a gas supply, said gas supply being controllable by said controller, said method further comprising:
   adjusting said gas supply to achieve said fermenting time.

5. The system of claim 4, said method further comprising:
   determining said standard recipe further comprising a standard gas supply volume;
   determining that said anticipated fermenting time is shorter than said standard fermenting time and adjusting said gas supply to supply more gas than said standard gas supply volume.

6. The system of claim 5, said gas supply configured to inject gas into said fermenting vessel submerged into liquid in said fermenting vessel.

7. The system of claim 6, said gas supply configured to supply at least one of a set of gasses comprising:

air; and
oxygen.

8. The system of claim 2, said anticipated fermenting time being determined by:
   detecting a reduction volume of said fermented liquid within said dispensing system; and
   determining said anticipated fermenting time based on replenishing said reduction volume.

9. The system of claim 8, said dispensing system having a reservoir mounted on a first electronic scale, said first electronic scale being connected to said controller, said controller being adapted to determine an amount of said fermented liquid in said dispensing system.

10. The system of claim 8, said method further comprising:
   determining a first volume of said fermented liquid removed from said fermenting vessel into said dispensing system; and
   causing said unfermented liquid to be added to said fermenter in an equivalent amount to said first volume of said fermented liquid.

11. A SCOBY structure comprising:
   a plurality of SCOBY cages, each of said SCOBY cages comprising:
      openings through which liquid flows, each of said SCOBY cages being adapted to contain a SCOBY; and
      a door;
   a frame connecting said plurality of SCOBY cages; and
   a first SCOBY cage being mounted below a second SCOBY cage, said frame being configured such that said first SCOBY is submerged when installed in a fermenting vessel;
   a lid adapted to rest on top of said fermenting vessel, said lid comprising a gas vent.

12. The SCOBY structure of claim 11, said lid comprising a gas inlet.

13. The SCOBY structure of claim 12, said lid comprising a gas dispenser tube having an outlet mounted below said first SCOBY cage.

14. The SCOBY structure of claim 13 further comprising a clamp adapted to connect to said fermenting vessel.

* * * * *